United States Patent
Glaser et al.

(10) Patent No.: US 10,173,590 B2
(45) Date of Patent: Jan. 8, 2019

(54) OVERLAYING ON AN IN-VEHICLE DISPLAY ROAD OBJECTS ASSOCIATED WITH POTENTIAL HAZARDS

(71) Applicant: GM Global Technology Operations LLC, Detroit, MI (US)

(72) Inventors: Yi G. Glaser, West Bloomfield, MI (US); Allan K. Lewis, Windsor (CA); Daniel S. Glaser, West Bloomfield, MI (US); Mohammad Naserian, Windsor (CA); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/443,699

(22) Filed: Feb. 27, 2017

(65) Prior Publication Data

US 2018/0244198 A1    Aug. 30, 2018

(51) Int. Cl.
*B60Q 1/00* (2006.01)
*B60Q 9/00* (2006.01)
*B60R 1/00* (2006.01)

(52) U.S. Cl.
CPC ............... *B60Q 9/008* (2013.01); *B60R 1/00* (2013.01); *B60R 2300/802* (2013.01)

(58) Field of Classification Search
CPC ...... B60Q 9/008; B60R 1/00; B60R 2300/802
USPC ..... 340/435, 425.5, 468, 479, 903; 348/148; 701/36, 41
See application file for complete search history.

(56) References Cited

U.S. PATENT DOCUMENTS

| | | | |
|---|---|---|---|
| 2012/0154591 A1* | 6/2012 | Baur | B60R 1/00 348/148 |
| 2014/0302774 A1* | 10/2014 | Burke | H04H 20/57 455/3.05 |
| 2015/0042799 A1 | 2/2015 | Zhang et al. | |
| 2015/0120137 A1* | 4/2015 | Zeng | G05D 1/024 701/41 |
| 2017/0197551 A1* | 7/2017 | Lee | G08G 1/166 |
| 2017/0267173 A1* | 9/2017 | Goo | B60Q 9/008 |

* cited by examiner

*Primary Examiner* — Dhaval Patel
(74) *Attorney, Agent, or Firm* — Cantor Colburn LLP

(57) ABSTRACT

Examples of techniques for overlaying on an in-vehicle display road objects associated with potential hazards are disclosed. In one example implementation, a method may include: responsive to detecting a presence of a detected vehicle in proximity to the local vehicle, determining, by a processing device, a position of the detected vehicle, a speed of the detected vehicle, and a time to the local vehicle of the detected vehicle; determining, by the processing device, whether the detected vehicle, in proximity to the local vehicle, represents a potential hazard to the local vehicle based on the position of the detected vehicle, the speed of the detected vehicle, and a time to the local vehicle of the detected vehicle; and responsive to determining that the detected vehicle, in proximity to the local vehicle, represents a potential hazard to the local vehicle, overlaying, by the processing device, a warning indicium on the in-vehicle display.

20 Claims, 8 Drawing Sheets

OVERLAYING ON AN IN-VEHICLE DISPLAY ROAD OBJECTS ASSOCIATED WITH POTENTIAL HAZARDS

The present disclosure relates to overlaying on an in-vehicle display road objects associated with potential hazards.

A vehicle, such as a car, a motorcycle, a boat, or any other type of automobile may be equipped with an in-vehicle display (e.g., a touchscreen). The display may be used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method for overlaying on an in-vehicle display road objects associated with potential hazards to a local vehicle includes, responsive to detecting a presence of a detected vehicle in proximity to the local vehicle, determining, by a processing device, a position of the detected vehicle, a speed of the detected vehicle, and a time to the local vehicle of the detected vehicle. The method further includes determining, by the processing device, whether the detected vehicle in proximity to the local vehicle represents a potential hazard to the local vehicle based on the position of the detected vehicle, the speed of the detected vehicle, and a time to the local vehicle of the detected vehicle. The method further includes responsive to determining that the detected vehicle in proximity to the local vehicle represents a potential hazard to the local vehicle, overlaying, by the processing device, a warning indicium on the in-vehicle display.

In some example methods, the warning indicium on the in-vehicle display is indicative of the potential hazard to the vehicle. In some example methods, the warning indicium is one of a box overlaid around the detected vehicle, an arrow along a path of the detected vehicle, or a warning message. An example method may include generating an audible signal to alert a driver of the local vehicle when the warning indicium is overlaid on the in-vehicle display. In some example methods, the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle. In some example methods, the detected vehicle is detected based on a signal received from a proximity sensor or camera of the local vehicle. In some example methods, the detected vehicle is detected based on a dedicated short range communication received from the detected vehicle.

In another exemplary embodiment a system overlaying on an in-vehicle display road objects associated with potential hazards to a local vehicle, the system includes an in-vehicle display configured to display an image. The system further includes a positioning engine. The positioning engine is configured to determine a position of the detected vehicle, a speed of the detected vehicle, and a time to the local vehicle of the detected vehicle responsive to detecting a presence of a detected vehicle in proximity to the local vehicle. The positioning engine is further configured to determine whether the detected vehicle in proximity to the local vehicle represents a potential hazard to the local vehicle based on the position of the detected vehicle, the speed of the detected vehicle, and a time to the local vehicle of the detected vehicle. The system also includes a warning overlay engine configured to overlay a warning indicium on the in-vehicle display responsive to determining that the detected vehicle in proximity to the local vehicle represents a potential hazard to the local vehicle.

In some example systems, the warning indicium on the in-vehicle display is indicative of the potential hazard to the vehicle. In some example systems, the warning indicium is one of a box overlaid around the detected vehicle, an arrow along a path of the detected vehicle, or a warning message. An example system may include generating an audible signal to alert a driver of the local vehicle when the warning indicium is overlaid on the in-vehicle display. In some example systems, the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle. In some example systems, the detected vehicle is detected based on a signal received from a proximity sensor or camera of the local vehicle. In some example systems, the detected vehicle is detected based on a dedicated short range communication received from the detected vehicle.

In yet another exemplary embodiment a computer program product for overlaying on an in-vehicle display, road objects associated with potential hazards to a local vehicle may include a computer readable storage medium having program instructions embodied therewith, wherein the computer readable storage medium is not a transitory signal per se, the program instructions executable by a processing device to cause the processing device to perform a method. In examples, the method includes, responsive to detecting a presence of a detected vehicle in proximity to the local vehicle, determining, by a processing device, a position of the detected vehicle, a speed of the detected vehicle, and a time to the local vehicle of the detected vehicle. The method further includes determining, by the processing device, whether the detected vehicle in proximity to the local vehicle represents a potential hazard to the local vehicle based on the position of the detected vehicle, the speed of the detected vehicle, and a time to the local vehicle of the detected vehicle. The method further includes responsive to determining that the detected vehicle in proximity to the local vehicle represents a potential hazard to the local vehicle, overlaying, by the processing device, a warning indicium on the in-vehicle display.

In some example methods, the warning indicium on the in-vehicle display is indicative of the potential hazard to the vehicle. In some example methods, the warning indicium is one of a box overlaid around the detected vehicle, an arrow along a path of the detected vehicle, or a warning message. An example method may include generating an audible signal to alert a driver of the local vehicle when the warning indicium is overlaid on the in-vehicle display. In some example methods, the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle. In some example methods, the detected vehicle is detected based on a signal received from a proximity sensor of the local vehicle. In some example methods, the detected vehicle is detected based on a dedicated short range communication received from the detected vehicle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
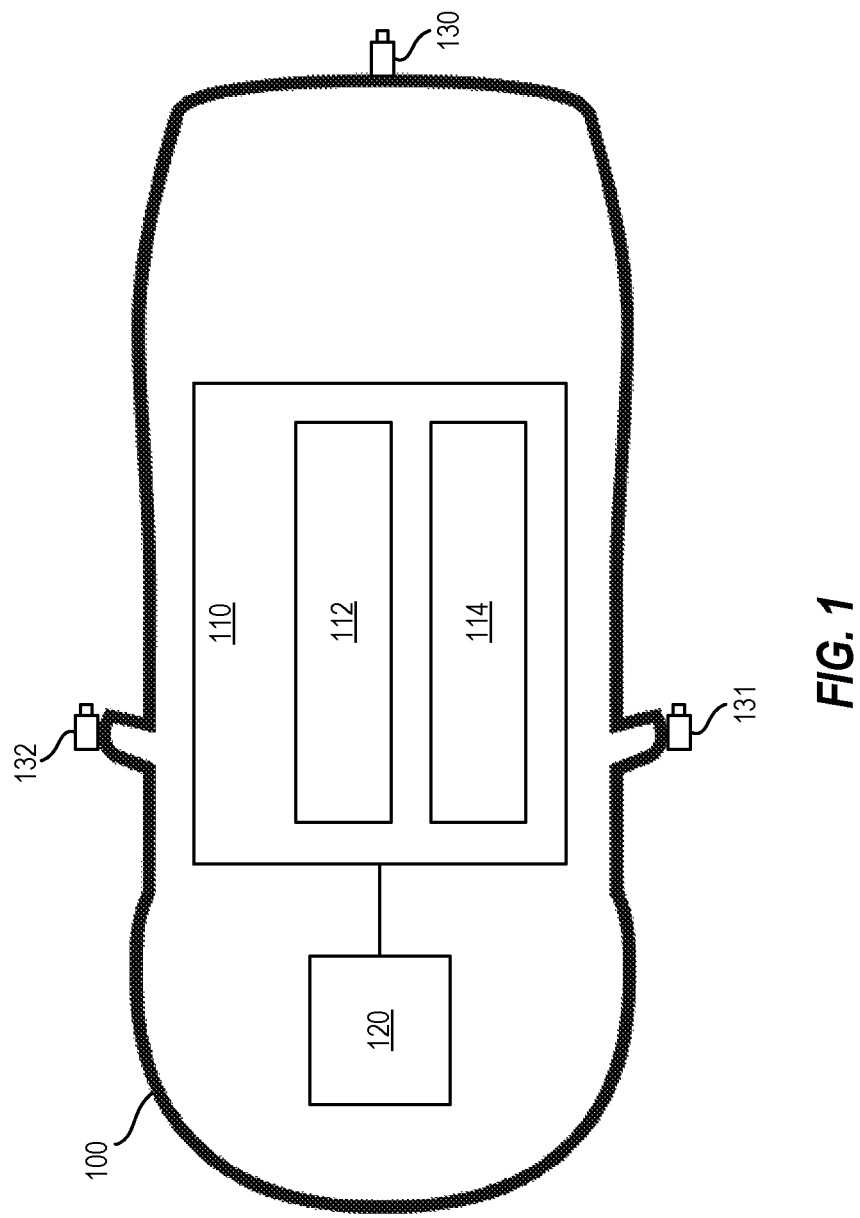
FIG. 1 illustrates a vehicle including a processing system for overlaying on an in-vehicle display road objects associated with potential hazards according to embodiments of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for overlaying road objects associated with potential hazards on an in-vehicle display. Potential hazards include other vehicles, road debris, potholes, pedestrians, cyclists, and the like. This enables a driver to be presented with additional information about his surroundings. A vehicle may be equipped with an in-vehicle display, which may be used to display camera images and other images to a driver of the vehicle. As described above, a traditional rear-view mirror and/or side-view mirror may be replaced with a display that displays a camera image from a camera positioned external to the vehicle (e.g., on the rear of the vehicle, on the sides of the vehicle, on the front of the vehicle, etc.) to display external views (e.g., a "rear view," a "side view," etc.) to the driver in place of the traditional mirror. Of course, the display may be used to display any suitable information, such as other views from or within the vehicle, navigational information, audio information, vehicle information, and the like.

By overlaying road objects associated with potential hazards on the display, the present techniques provide safety benefits by more accurately judging an object's speed and distance and providing this information to the vehicle's operator. For example, a driver may be alerted to a vehicle in a blind zone, a fast approaching vehicle, and/or a tailgating vehicle. Directly identifying and displaying hazard related objects provides additional safety benefits over a separate graphic alert, such as a blind zone alert. To achieve this, the present techniques utilize a proximity sensor (e.g., an ultrasonic sensor, a short range radar, etc.) and/or dedicated short range communications (DSRC) data to augment objects on the in-vehicle display that may cause a conflict. The display may be a full display mirror, a touch screen, or a screen. Unlike augmented reality approaches, the present techniques do not require mapping augmenting graphics to objects in the actual space.

FIG. 1 illustrates a vehicle 100 ("local vehicle") including a processing system 110 for overlaying on an in-vehicle display 112 road objects associated with potential hazards according to embodiments of the present disclosure. In particular, the vehicle 100 may include the processing system 110, the display 120, and cameras 130, 131, 132. The vehicle 100 may be a car, truck, van, bus, motorcycle, boat, plane, or another suitable vehicle 100.

The cameras 130-132 capture images external to the vehicle 100. It should be appreciated that, although three cameras 130-132 are shown, more or fewer cameras may be implemented in various embodiments. The captured images (also referred to as a "primary image") may be displayed on the display 120 to provide external views of the vehicle 100 to the driver/operator of the vehicle 100. The captured images can be displayed on the display 210 as live images, still images, or some combination thereof. The display 120 may be a full display mirror (FDM) which is enabled to display images, such as the primary image, from one or more of the cameras 130-132. It should be appreciated that the primary image may be a single image from one of the cameras 130-132 or may be a combination of images from more than one of the cameras 130-132. The FDM may be a traditional mirror in one mode or may be a display 120 for displaying digital images in another mode. It should be appreciated that camera images may be displayed by any other in-vehicle displays, such as a center stack, and camera images may be from any other interior or exterior vehicle cameras.

The processing system 110 may be used to facilitate a number of use cases for overlaying on an in-vehicle display road objects associated with potential hazards. For example, the processing system 110 may alert a driver or operator of the vehicle 100 to potential hazards including a fast approaching vehicle in an adjacent lane, a fast approaching vehicle behind the vehicle 100 in a lane of the vehicle 100, a presence of another vehicle in a blind spot of the vehicle 100, and other similar potential hazards.

In order to overlay on an in-vehicle display road objects associated with potential hazards to a local vehicle (e.g., the vehicle 100), the processing system 110 may operate as follows. For example, a positioning engine 112 of the processing system 110 determines a position of a detected vehicle, a speed of the detected vehicle, and a time to the local vehicle of the detected vehicle responsive to detecting the presence of the detected vehicle in proximity to the vehicle 100. The detected vehicle is considered in proximity to the vehicle 100 when the detected vehicle is detected by a proximity sensor, detected by a dedicated short range communication (DSRC) from the detected vehicle, and/or is detected by another suitable detection technique.

The positioning engine 112 of the processing system 110 then determines whether the detected vehicle in proximity to the local vehicle represents a potential hazard to the local vehicle based on the position of the detected vehicle, the speed of the detected vehicle, and a time to the local vehicle of the detected vehicle. If it is determined that the detected vehicle in proximity to the vehicle 100 represents a potential hazard to the vehicle 100, a warning overlay engine 114 of the processing system 110 overlays a warning indicium on the display 120. The warning indicium may be overlaid onto the primary image of the display 120 to alert the driver or operator of the vehicle 100 of the potential hazard.

Figure 2A:
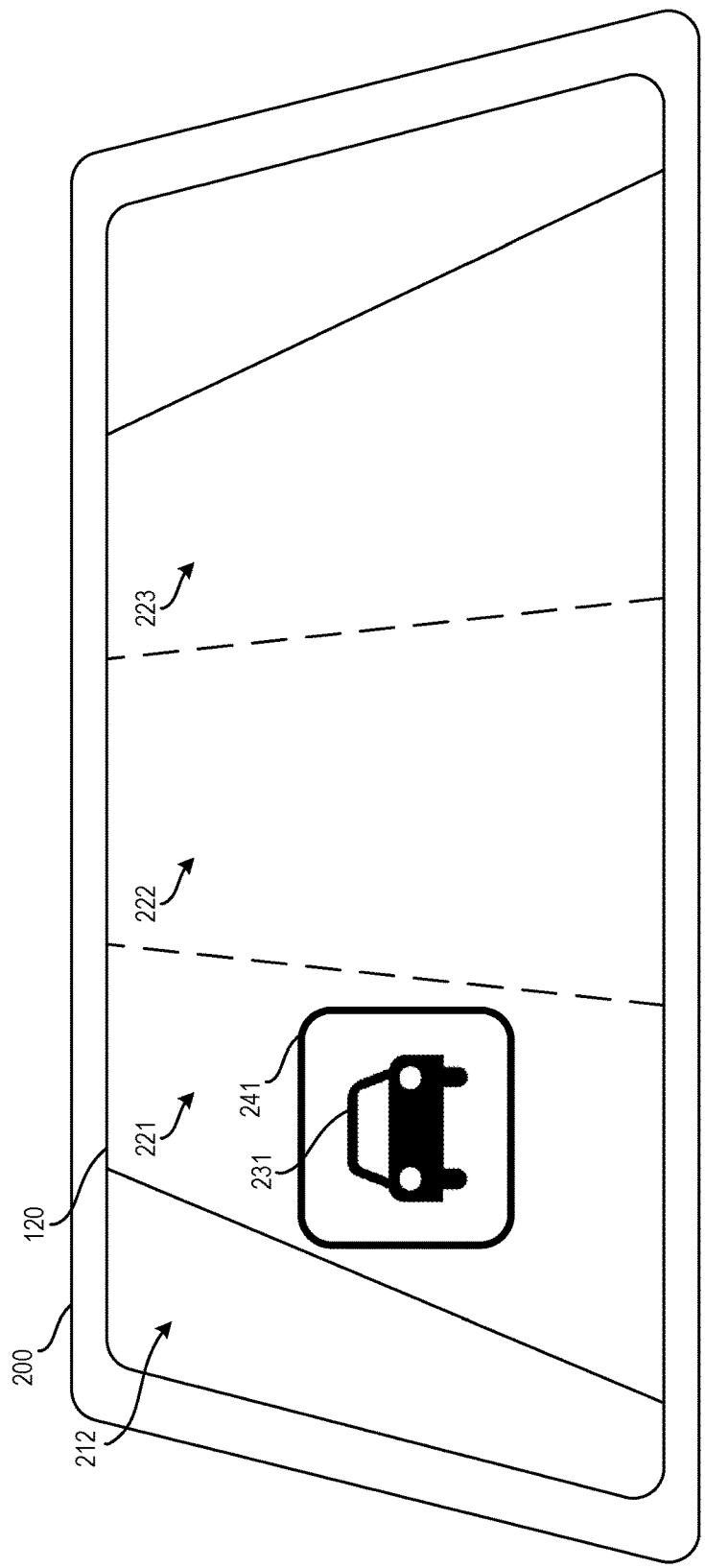
FIGS. 2A, 2B, and 2C illustrate examples of a full display mirror that includes an in-vehicle display for overlaying on the in-vehicle display road objects associated with potential hazards according to embodiments of the present disclosure.
Figure 2B:
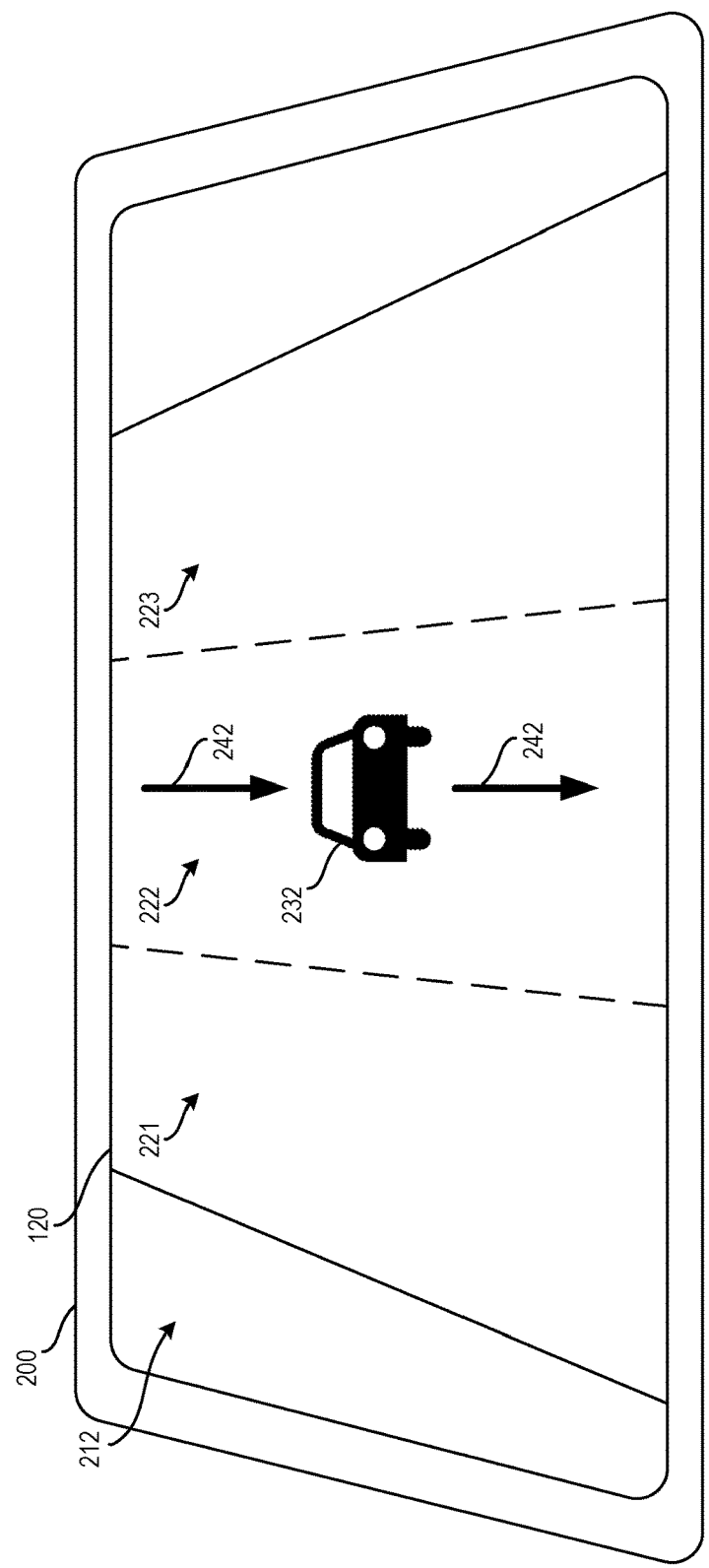
Figure 2C:
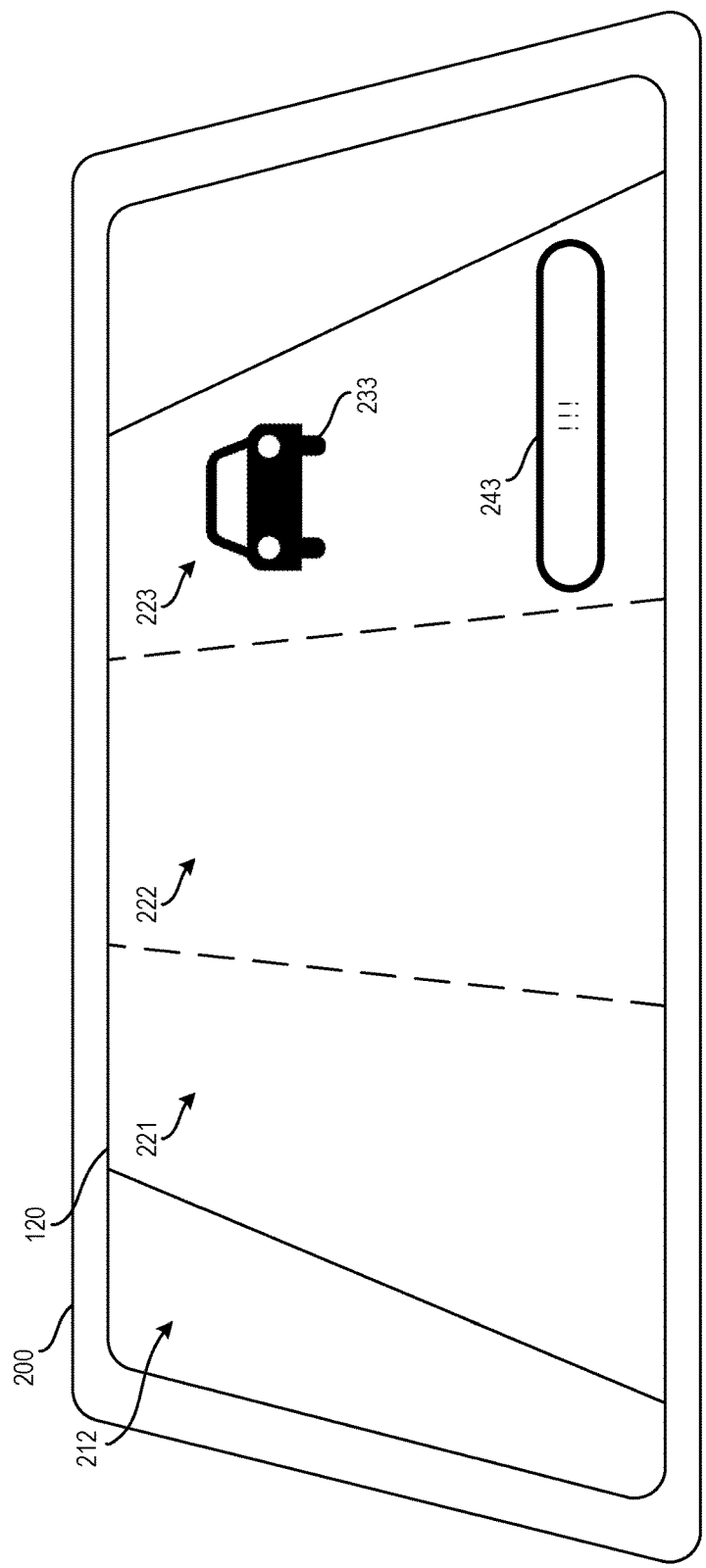

FIGS. 2A, 2B, and 2C illustrate examples of a full display mirror 200 that includes an in-vehicle display 120 for overlaying on the in-vehicle display 120 road objects associated with potential hazards according to embodiments of the present disclosure. In the examples of FIGS. 2A, 2B, and 2C, the display 120 displays a primary image 212 that may be captured by a camera, such as the camera 130, to display a rear view of the vehicle 100. The primary image shows a roadway having a first lane 221, a second lane 222, and a third lane 223. It should be appreciated that the present techniques apply to detecting hazards behind, beside, and/or in front of the vehicle. For example, the present techniques may warn the driver of a hazard in front of the vehicle, such as road debris, a stalled or disabled vehicle, and the like.

In the example of FIG. 2A, the primary image 212 shows a detected vehicle 231 in the lane 221. The positioning engine 112 of the processing system 110 determines a position of a detected vehicle 231, a speed of the detected vehicle 231, and a time to the local vehicle 100 of the detected vehicle 231. If the vehicle 231 is determined by the positioning engine 112 to be a potential hazard to the vehicle 100, the warning overlay engine 114 overlays a warning indicium on the display 120. In the case of FIG. 2A, it is determined that the detected vehicle 231 is within a blind spot of the local vehicle 100, and accordingly the warning overlay engine 114 overlays a warning indicium of a box 241 around the vehicle 231 on the display 120. In this way, the driver or operator of the vehicle 100 is alerted to the potential hazard of the vehicle 231 being in an adjacent lane and therefore the driver should not change lanes due to the potential conflict associated with the location of the vehicle 231.

It should be appreciated that other indicium may be used and that the indicium may include properties that enable the indicium to be changed based on criteria such as the seriousness of risk, type of risk, the immediacy of risk, etc., and may be customized by the user and/or preset. Additionally, the indicium may change transparency levels, color, line width, display frequency (e.g., redraw), and the like.

In the example of FIG. 2B, the primary image 212 shows a detected vehicle 232 in the lane 222. The positioning engine 112 of the processing system 110 determines a position of a detected vehicle 232, a speed of the detected vehicle 232, and a time to the local vehicle 100 of the detected vehicle 232. If the vehicle 232 is determined by the positioning engine 112 to be a potential hazard to the vehicle 100, the warning overlay engine 114 overlays a warning indicium on the display 120. In the case of FIG. 2B, it is determined that the detected vehicle 232 is rapidly approaching the local vehicle 100, which may indicate a potential rear-end collision caused by the vehicle 232. Accordingly, the warning overlay engine 114 overlays a warning indicium of arrows 242 showing the path of the vehicle 232 on the display 120. In this way, the driver or operator of the vehicle 100 is alerted to the potential hazard of the vehicle 232 rapidly approaching and therefore the driver should potential change lanes, speed up, etc. to avoid a potential collision caused by the rapidly approaching vehicle 232.

In the example of FIG. 2C, the primary image 212 shows a detected vehicle 233 in the lane 223. The positioning engine 112 of the processing system 110 determines a position of a detected vehicle 233, a speed of the detected vehicle 233, and a time to the local vehicle 100 of the detected vehicle 233. If the vehicle 233 is determined by the positioning engine 112 to be a potential hazard to the vehicle 100, the warning overlay engine 114 overlays a warning indicium on the display 120. In the case of FIG. 2C, it is determined that the detected vehicle 233 is rapidly approaching the local vehicle 100 in a lane adjacent to the lane 222 occupied by the local vehicle 100. This may indicate a potential hazard if the vehicle 100 changes lanes from lane 222 to lane 223 in the path of the detected vehicle 233. Accordingly, the warning overlay engine 114 overlays a warning indicium of a warning message 243 on the display 120. The warning message 243 may include text, symbols, or other information that may provide the driver or operator of the vehicle 100 with information about the potential hazard. In this way, the driver or operator of the vehicle 100 is alerted to the potential hazard of the vehicle 233 rapidly approaching in an adjacent lane and therefore the driver should not change lanes into the path of the vehicle 233 to avoid a potential collision.

According to some examples, the processing system 110 may generate an audio signal inside the vehicle 100 to alert the driver that a potential hazard exists. The audio signal may be generated when the warning indicium is overlaid on the in-vehicle display 120. This provides the driver with additional notice of the potential hazard and may cause the driver to look at the display to gain more information about the additional hazard via the overlay. In some examples, a haptic signal, an audio signal, or another type of signal may be used to provide notice to the driver.

Figure 3:
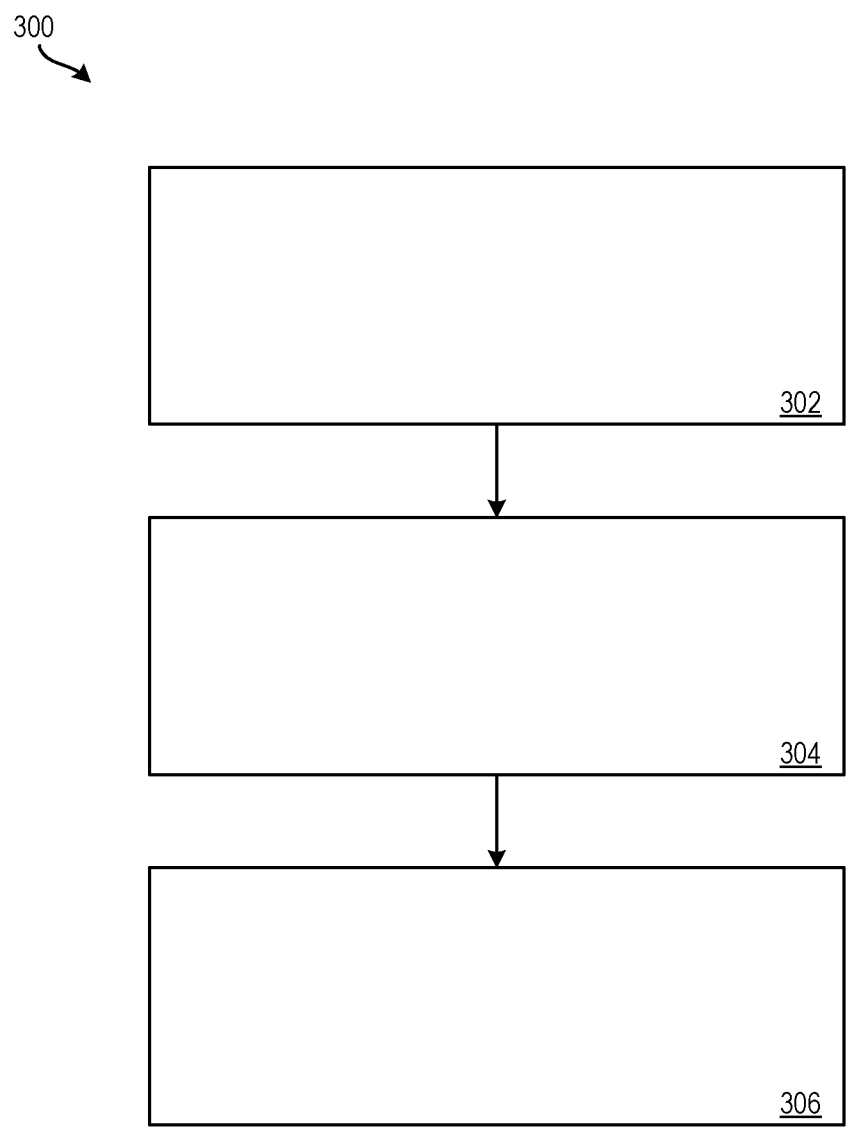
FIG. 3 illustrates a flow diagram of a method for overlaying on the in-vehicle display road objects associated with potential hazards according to aspects of the present disclosure.

FIG. 3 illustrates a flow diagram of a method 300 for overlaying on the in-vehicle display 120 road objects associated with potential hazards according to aspects of the present disclosure. The method 300 may be implemented, for example, by the processing system 110 of FIG. 1, by the processing system 20 of FIG. 6, or by another suitable processing system or device.

At block 302, the method 300 includes determining, by a processing device (e.g., the processing system 110 of FIG. 1), a position of the detected vehicle, a speed of the detected vehicle, and a time to the local vehicle of the detected vehicle responsive to detecting a presence of a detected vehicle in proximity to the local vehicle. The presence of a detected vehicle may be detected by a proximity sensor, by a DSRC, or by another detection technique.

At block 304, the method 300 includes determining, by the processing device, whether the detected vehicle in proximity to the local vehicle represents a potential hazard to the local vehicle based on the position of the detected vehicle, the speed of the detected vehicle, and a time to the local vehicle of the detected vehicle. Whether the detected vehicle represents a potential hazard is determined based on how the detection occurred (e.g., by the proximity sensor, by DSRC, etc.). Examples of such a determination are described herein with reference to FIGS. 4 and 5.

At block 306, the method 300 includes overlaying, by the processing device, a warning indicium on the in-vehicle display responsive to determining that the detected vehicle in proximity to the local vehicle represents a potential hazard to the local vehicle.

Additional processes also may be included, and it should be understood that the processes depicted in FIG. 3 represent illustrations and that other processes may be added or existing processes may be removed, modified, or rearranged without departing from the scope and spirit of the present disclosure.

Figure 4:
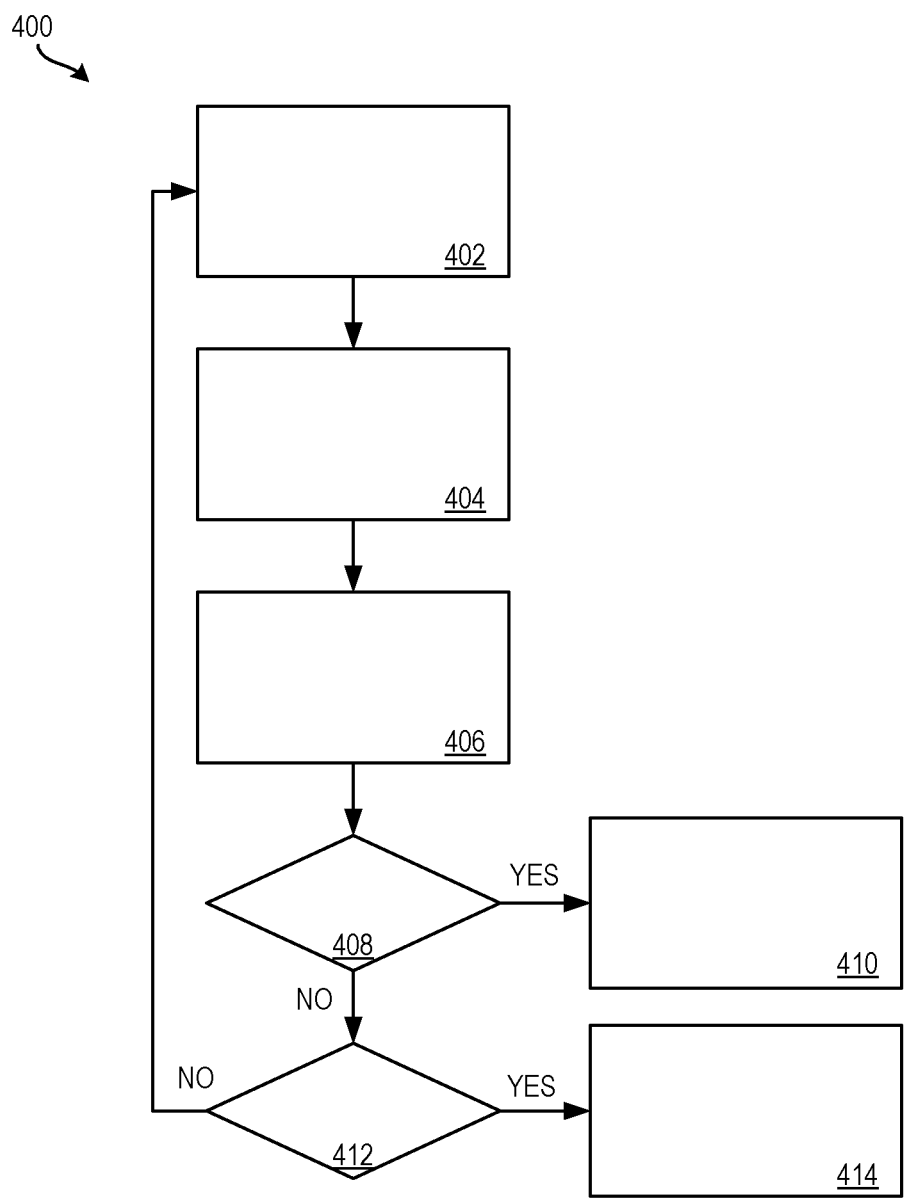
FIG. 4 illustrates a flow diagram of a method for determining whether a detected vehicle represents a potential hazard to a local vehicle using a proximity sensor according to aspects of the present disclosure.

FIG. 4 illustrates a flow diagram of a method for determining whether a detected vehicle represents a potential hazard to a local vehicle 100 using a proximity sensor according to aspects of the present disclosure. The method 400 may be implemented, for example, by the processing system 110 of FIG. 1, by the processing system 20 of FIG. 6, or by another suitable processing system or device.

At block 402, the method 400 includes determining a position of the detected vehicle at time t using data from two proximity sensors located on the left and right sides of the vehicle 110. At block 404, the method 400 includes determining an approach speed of the detected vehicle based on the left and right proximity sensors. The approach speed is equal to the detected vehicle position at time t minus the detected vehicle position at time t−1 divided by a loop time (i.e., the time between readings). At block 406, the method 400 incudes determining a time to the local vehicle from the detected vehicle by subtracting detected vehicle approach speed from the local vehicle's speed and dividing by the detected vehicle position at time t.

At decision block 408, it is determined whether the time of block 406 is less than a first threshold. If so, a critical indicium is displayed at block 410. If not, it is then determined at decision block 412 whether the time is less than a second threshold. If so, a warning indicium is displayed at block 414. If not, the method 400 may end or repeat. The first threshold may be shorter than the second threshold such that more immediate risks receive a critical indicium and less immediate risks receive a warning indicium. For example, the first threshold may be approximately 0.5 seconds and the second threshold may be approximately 1 second in one example. In other examples, other threshold values may be used.

Additional processes also may be included, and it should be understood that the processes depicted in FIG. 4 represent illustrations and that other processes may be added or existing processes may be removed, modified, or rearranged without departing from the scope and spirit of the present disclosure.

Figure 5:
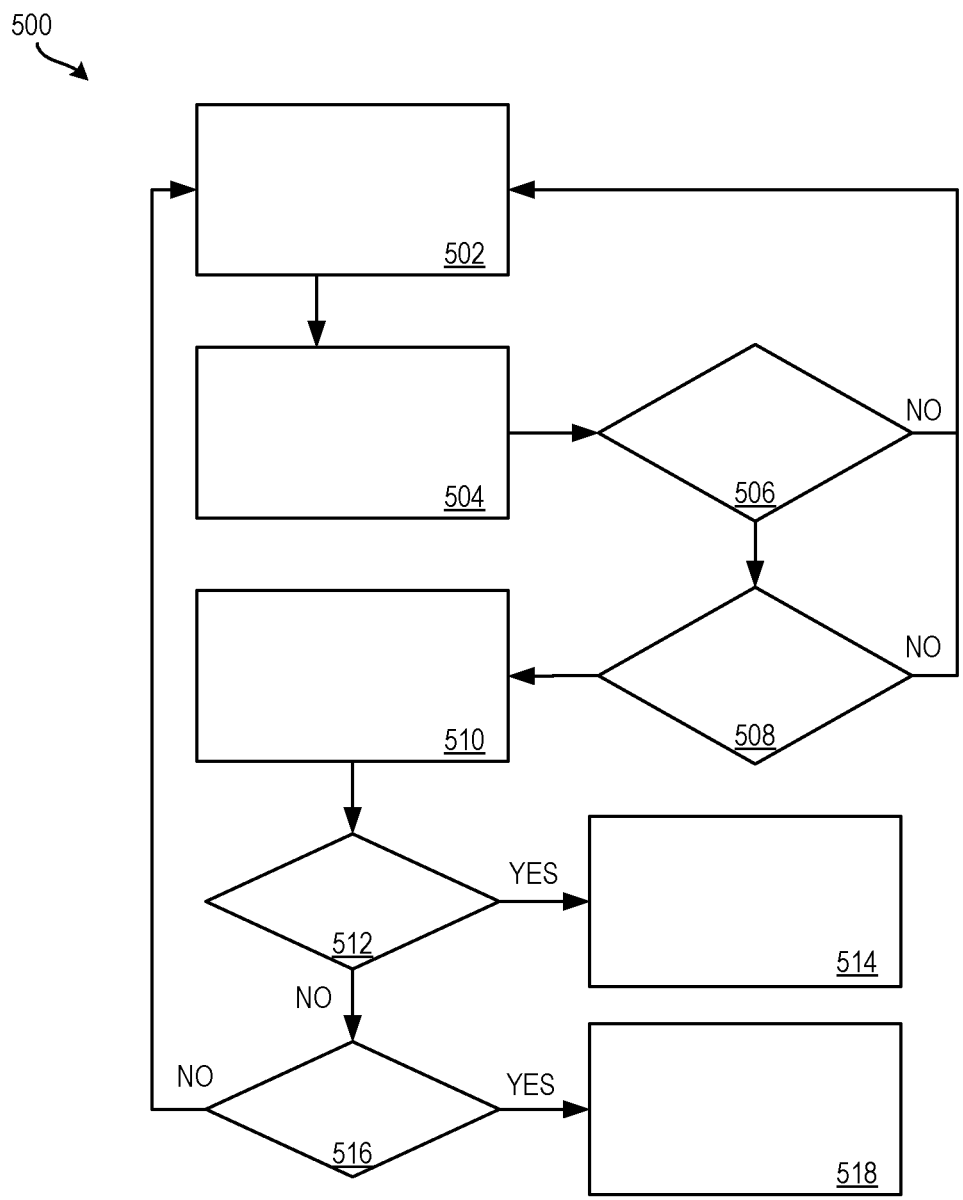
FIG. 5 illustrates a flow diagram of a method for determining whether a detected vehicle represents a potential hazard to a local vehicle using a dedicated short range communication according to aspects of the present disclosure.

FIG. 5 illustrates a flow diagram of a method for determining whether a detected vehicle represents a potential hazard to a local vehicle 100 using a dedicated short range communication (DSRC) according to aspects of the present disclosure. The method 500 may be implemented, for example, by the processing system 110 of FIG. 1, by the processing system 20 of FIG. 6, or by another suitable processing system or device.

At block 502, a DSRC message is received from another vehicle. At block 504, the DSRC message is parsed to extract position and speed data about the detected vehicle. At decision block 506 it is determined whether the detected vehicle is behind the local vehicle. If not, the method 500 ends or repeats. If so, it is determined at decision block 508 whether the detected vehicle is in a lane adjacent to the local vehicle. If no, the method 500 ends or repeats. If so, at block 510 the method 500 includes determining a time to the local vehicle from the detected vehicle by subtracting detected vehicle approach speed from the local vehicle's speed and dividing by the detected vehicle position at time t.

At decision block 512, it is determined whether the time of block 510 is less than a first threshold. If so, a critical indicium is displayed at block 514. If not, it is then determined at decision block 516 whether the time is less than a second threshold. If so, a warning indicium is displayed at block 518. If not, the method 500 may end or repeat. The first threshold may be shorter than the second threshold such that more immediate risks receive a critical indicium and less immediate risks receive a warning indicium. For example, the first threshold may be approximately 0.5 seconds and the second threshold may be approximately 1 second in one example. In other examples, other threshold values may be used.

Additional processes also may be included, and it should be understood that the processes depicted in FIG. 5 represent illustrations and that other processes may be added or existing processes may be removed, modified, or rearranged without departing from the scope and spirit of the present disclosure.

Figure 6:
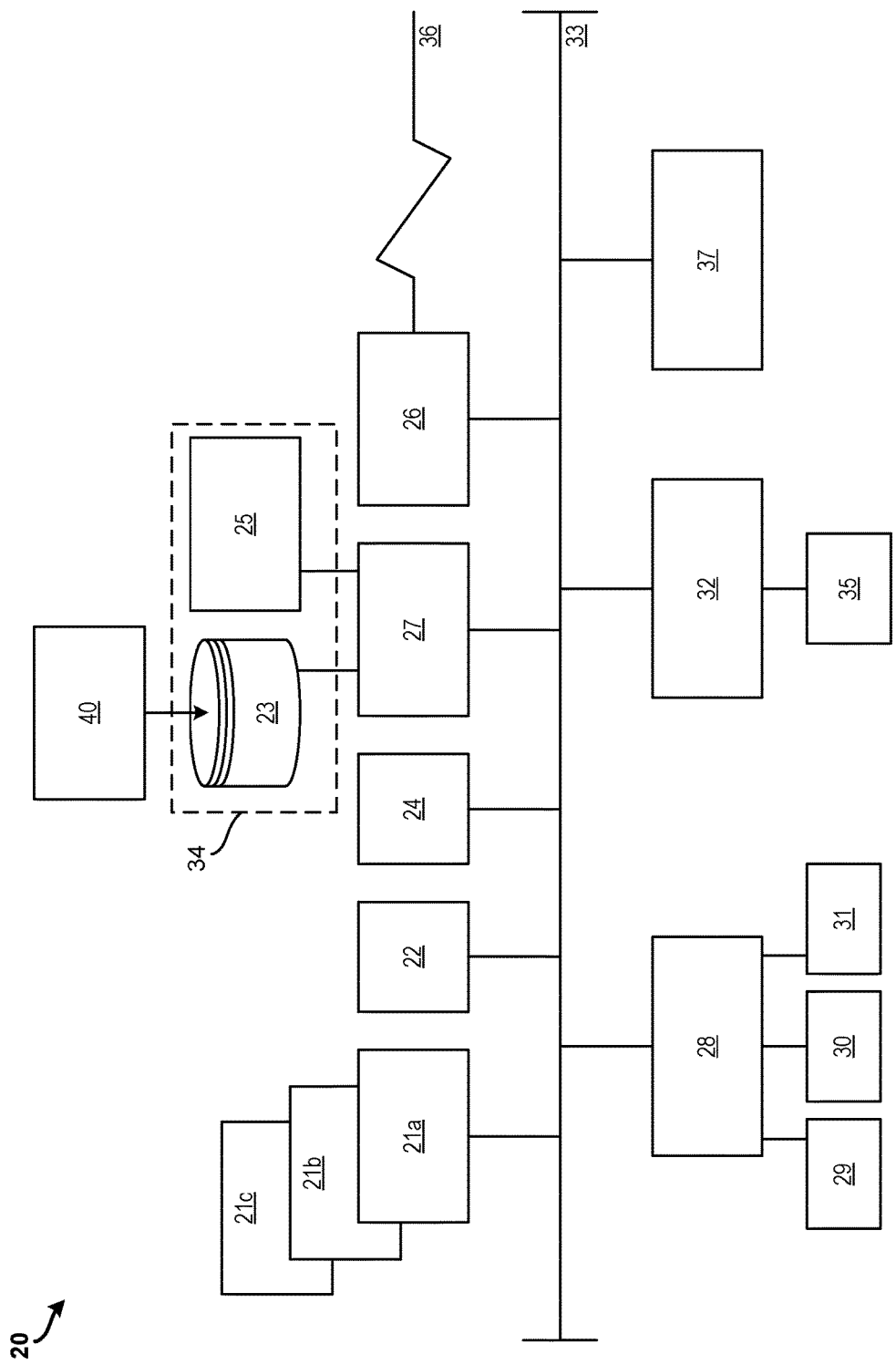
FIG. 6 illustrates a block diagram of a processing system for implementing the techniques described herein according to an exemplary embodiment.

It is understood that the present disclosure is capable of being implemented in conjunction with any other type of computing environment now known or later developed. For example, FIG. 6 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or other storage drive 25 or any other similar component. I/O adapter 27, hard disk 23, and other storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 24, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for overlaying, on an in-vehicle display, road objects associated with potential hazards to a local vehicle, the method comprising:
    detecting, by a processing device, a presence of a detected vehicle in proximity to the local vehicle based on a dedicated short range communication transmitted by the detected vehicle and received at the local vehicle;
    responsive to detecting the presence of the detected vehicle in proximity to the local vehicle, determining, by the processing device, a position of the detected vehicle, a speed of the detected vehicle, and a time to the local vehicle of the detected vehicle;
    determining, by the processing device, whether the detected vehicle, in proximity to the local vehicle, represents a potential hazard to the local vehicle based on the position of the detected vehicle, the speed of the detected vehicle, and a time to the local vehicle of the detected vehicle; and
    responsive to determining that the detected vehicle, in proximity to the local vehicle, represents a potential hazard to the local vehicle, overlaying, by the processing device, an indicium on the in-vehicle display, wherein the in-vehicle display is a full display mirror that displays images in a first mode and is a mirror in a second mode, wherein the full display mirror displays an image captured by a camera associated with the vehicle when the full display mirror is in the first mode, wherein the image is an image external to the vehicle, and wherein the indicium is overlaid on the image captured by the camera and displayed on the in-vehicle display.

2. The computer-implemented method of claim 1, wherein the indicium on the in-vehicle display is indicative of the potential hazard to the vehicle.

3. The computer-implemented method of claim 1, wherein the indicium is one of a box overlaid around the detected vehicle, an arrow along a path of the detected vehicle, or a warning message.

4. The computer-implemented method of claim 1, further comprising generating an audible signal to alert a driver of the local vehicle when the indicium is overlaid on the in-vehicle display.

5. The computer-implemented method of claim 1, wherein the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle.

6. A system for overlaying on an in-vehicle display road objects associated with potential hazards to a local vehicle, the system comprising:
    an in-vehicle display configured to display an image;
    a positioning engine configured to
        determine a position of the detected vehicle, a speed of the detected vehicle, and a time to the local vehicle of the detected vehicle responsive to detecting a presence of a detected vehicle in proximity to the local vehicle, and
        determine whether the detected vehicle, in proximity to the local vehicle, represents a potential hazard to the local vehicle based on the position of the detected vehicle, the speed of the detected vehicle, and a time to the local vehicle of the detected vehicle; and
    an overlay engine configured to overlay an indicium on the in-vehicle display responsive to determining that the detected vehicle, in proximity to the local vehicle, represents a potential hazard to the local vehicle,
    wherein the indicium is selected from a plurality of indicia based at least in part on a severity of the potential hazard to the local vehicle, wherein the in-vehicle display is a full display mirror that displays images in a first mode and is a mirror in a second mode, wherein the full display mirror displays an image captured by a camera associated with the vehicle when the full display mirror is in the first mode, wherein the image is an image external to the vehicle, and wherein the indicium is overlaid on the image captured by the camera and displayed on the in-vehicle display.

7. The system of claim 6, wherein the indicium on the in-vehicle display indicative of the potential hazard to the vehicle.

8. The system of claim 6, wherein the indicium is one of a box overlaid around the detected vehicle, an arrow along a path of the detected vehicle, or a warning message.

9. The system of claim 6, wherein the overlay engine is further configured to generate an audible signal to alert a driver of the local vehicle when the indicium is overlaid on the in-vehicle display.

10. The system of claim 6, wherein the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle.

11. The system of claim 6, wherein the detected vehicle is detected based on a signal received from a proximity sensor of the local vehicle.

12. The system of claim 6, wherein the detected vehicle is detected based on a dedicated short range communication received from the detected vehicle.

13. A computer program product for overlaying on an in-vehicle display road objects associated with potential hazards to a local vehicle, the computer program product comprising:

a computer readable storage medium having program instructions embodied therewith, wherein the computer readable storage medium is not a transitory signal per se, the program instructions executable by a processing device to cause the processing device to perform a method comprising:

detecting, by the processing device, a presence of a detected vehicle in proximity to the local vehicle based on a dedicated short range communication transmitted by the detected vehicle and received at the local vehicle;

responsive to detecting the presence of the detected vehicle in proximity to the local vehicle, parsing, by the processing device, the DSRC to extract a position of the detected vehicle and a speed of the detected vehicle;

determining, by the processing device, a time to the local vehicle of the detected vehicle based at least in part on the position of the detected vehicle and the speed of the detected vehicle;

determining, by the processing device, whether the detected vehicle, in proximity to the local vehicle, represents a potential hazard to the local vehicle based on the position of the detected vehicle, the speed of the detected vehicle, and a time to the local vehicle of the detected vehicle; and responsive to determining that the detected vehicle, in proximity to the local vehicle, represents a potential hazard to the local vehicle, overlaying, by the processing device, an indicium on the in-vehicle display, wherein the in-vehicle display is a full display mirror that displays images in a first mode and is a mirror in a second mode, wherein the full display mirror displays an image captured by a camera associated with the vehicle when the full display mirror is in the first mode, wherein the image is an image external to the vehicle, and wherein the indicium is overlaid on the image captured by the camera and displayed on the in-vehicle display.

14. The computer program product of claim 13, wherein the indicium on the in-vehicle display indicative of the potential hazard to the vehicle.

15. The computer program product of claim 13, wherein the indicium is one of a box overlaid around the detected vehicle, an arrow along a path of the detected vehicle, or a warning message.

16. The computer program product of claim 13, wherein the method further comprises generating an audible signal to alert a driver of the local vehicle when the indicium is overlaid on the in-vehicle display.

17. The computer program product of claim 13, wherein the potential hazard is one of the detected vehicle being in a blind spot of the local vehicle, the detected vehicle rapidly approaching the local vehicle in an adjacent lane of the local vehicle, or the detected vehicle rapidly approaching the local vehicle in a shared lane of the local vehicle.

18. The system of claim 6, wherein the plurality of indicia comprises at least a critical indicium and a warning indicium, wherein the overlay engine overlays the critical indicium when the time to the local vehicle of the detected vehicle is less than a first threshold, and wherein the overlay engine overlays the warning indicium when the time to the local vehicle of the detected vehicle is greater than the first threshold and less than a second threshold.

19. The computer program product of claim 13, wherein the indicium is selected from a plurality of indicia based at least in part on a severity of the potential hazard to the local vehicle.

20. The computer program product of claim 19, wherein the plurality of indicia comprises at least a critical indicium and a warning indicium, wherein the critical indicium is overlaid when the time to the local vehicle of the detected vehicle is less than a first threshold, and wherein the warning indicium is overlaid when the time to the local vehicle of the detected vehicle is greater than the first threshold and less than a second threshold.

\* \* \* \* \*